June 21, 1960 S. ISENBERG ET AL 2,941,265
AIR PURIFIER
Filed Oct. 17, 1956 2 Sheets-Sheet 1

INVENTORS:
Sampson Isenberg
and Alfred A. Jannings,
BY Louis Bernat.
ATTORNEYS.

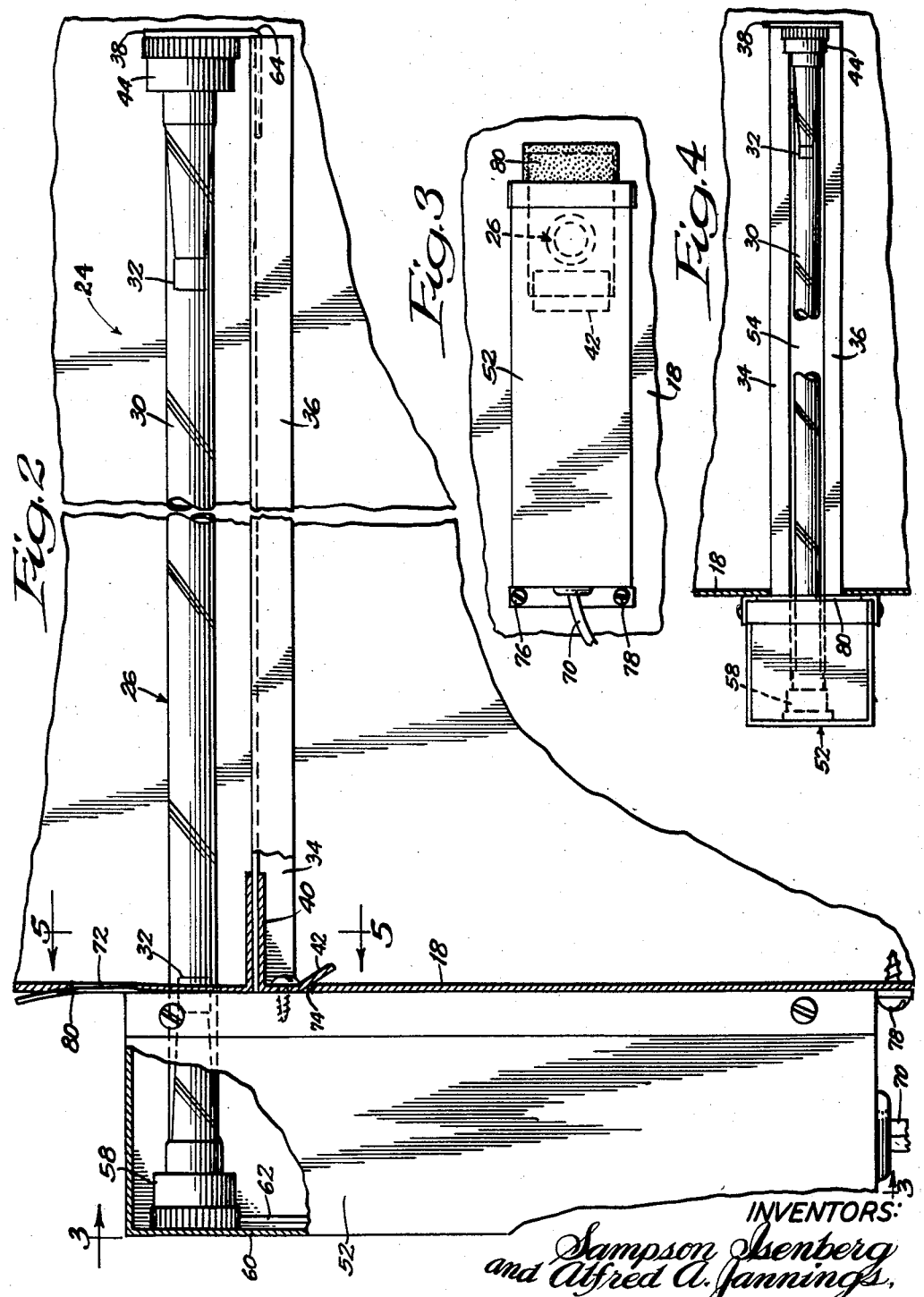

United States Patent Office 2,941,265
Patented June 21, 1960

2,941,265

AIR PURIFIER

Sampson Isenberg and Alfred A. Jannings, Chicago, Ill., assignors to Sampson Chemical & Pigment Corporation, a corporation of Illinois Filed Oct. 17, 1956, Ser. No. 616,425

3 Claims. (Cl. 21—74)

This invention relates generally to electronic radiation means for the control of airborne microorganisms and dust and more particularly to such radiation means adapted to be utilized with controlled air circulating systems.

Heating furnace and air conditioning cooling systems of the type wherein air of controlled temperature is continuously circulated are widely used in homes, offices, factories, stores and the like. It is a common practice to provide a mechanical filter in the return duct of such systems to reduce the amount of undesirable airborne matter in the circulated air. However, due to the inherent limitations of such mechanical filters, such filters have not proved entirely satisfactory for this purpose. Further, such filters are ineffective to remove odors, germs, viruses, mold spores, and bacteria from the air and consequently various chemicals and perfumes have been utilized in many prior art systems to provide an outdoor freshness to the circulated air.

It is a general object of this invention to provide improved air purifying means for use with controlled air circulating systems.

It is another object of this invention to provide electronic sunlight ultra-violet radiation means adapted for use in a duct of a controlled air circulating system which serves to provide germicidal rays for effectively destroying airborne microorganisms in the air and the elimination of airborne odors.

It is still another object of this invention to provide electronic radiation means adapted for use in a duct of a controlled air circulating system which further serves to produce a controlled amount of ozone in the duct to increase the dust collecting efficiency of the filter provided in the duct and the eliminating of odors that pass through the duct.

It is a further object of this invention to provide radiation means for controlling airborne microorganisms and dust in a circulating air system which further serves to effectively eliminate stale and odoriferous air and impart an outdoor freshness to the circulated air.

It is a still further object of this invention to provide an improved air purifier which is adapted for quick and easy installation with existing controlled air circulating systems.

It is a still further object of this invention to provide an air purifier for use in a duct of a controlled air circulating system which is characterized by its compactness, efficiency and economy of manufacture and operation.

These and other objects are realized in accordance with the features of a specific illustrative embodiment of the invention.

An elongated, ultraviolet, two wave band, cold cathode radiation lamp is adapted to be positioned in the return duct of a controlled air circulating system. Advantageously, the ultraviolet lamp is positioned in the path of the circulating air forward of the filter in the duct, such that the germicidal rays emanating from the lamp effectively destroy airborne germs, viruses, mold spores, bacteria and other microorganisms in the air and on the surface of the filter.

Additionally, the ultraviolet lamp substantially simultaneously produces a controlled amount of ozone in the air intermediate the ultraviolet lamp and the filter. This ozone serves to provide the lamp with a negative charge on its surface and further serves, as a result of decomposition at the filter surface, to provide the latter with a positive surface charge. Consequently, dust particles in the circulating air acquire a negative charge as they pass the ultraviolet lamp and are repelled therefrom. This action serves to maintain the two wave band cold cathode lamp relatively free of dust particles and increases its radiation efficiency.

Further negatively charged dust particles are attracted to the positively charged surface of the filter to increase the efficiency of the filter in collecting and removing dust from the circulated air.

Still further, the ozone produced by the ultraviolet two wave band, cold cathode lamp, being a strong oxidizing agent, serves to freshen the air circulated in the system by effectively eliminating staleness and odors from tobacco, cooking and the like.

The ultraviolet lamp is supported in the duct by means of a pair of spaced parallel elongated rails having a channel therebetween to permit substantially 360° radiation of ultraviolet rays from the lamp. The rails also produce turbulence of air in the duct, which together with the 360° radiation provided, serves to substantially increase the efficiency of the ultraviolet rays.

The ultraviolet lamp and its supporting rails are mounted in perpendicularly extending relation to a housing which encloses a high voltage transformer adapted to energize the ultraviolet lamp. Advantageously, the housing has attached thereto a self-locking flange extending below the rails at an angle to the housing. The purifier is adapted to be quickly and easily installed in existing air circulating systems by providing a relatively small rectangular opening in the wall of the duct where the unit is to be installed. Preferably this opening should be forward of the filter in the duct. The ultraviolet lamp and its supporting rails are inserted into the opening such that the lamp extends substantially across the duct in the path of the circulated air and the unit is locked into place by slipping the angled flange over the bottom edge of the opening such that the housing is supportingly mounted on the outside wall of the duct. The purifying unit may be further secured by means of sheet metal screws inserted through holes provided in the top and bottom of the front wall of the housing.

In accordance with the invention proper operation of the invention may be indicated by means of a luminous indicator marker placed in the front wall of the duct above the housing and which is responsive to certain radiations of the ultraviolet lamp.

The above and other features of novelty which characterize the invention are pointed out with particularity in the claims annexed to and forming a part of this specification. For a better understanding of this invention, however, its advantages and specific objects attained by its use, reference is had to the accompanying drawing and descriptive matter in which is shown and described an illustrative embodiment of the invention.

In the drawing:

Figure 2 is a side elevational view, partially broken away and taken through a section of the housing, of the air purifying unit embodying the invention;

Figure 3 is a back elevational view of the housing taken substantially as shown on line 3—3 of Figure 2;

Figure 4 is a top plan view of the air purifying unit shown in Figure 2;

Figure 1:
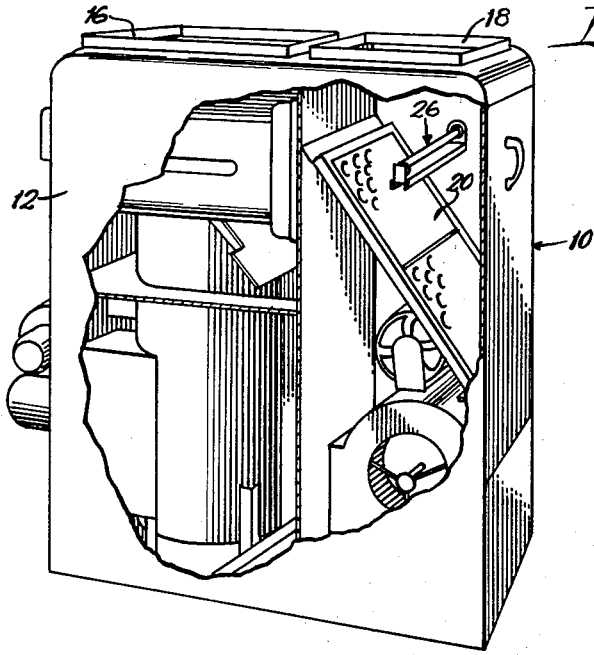
Figure 1 is a heating furnace including a cold air return duct, shown in section, embodying the invention.
Figure 5:
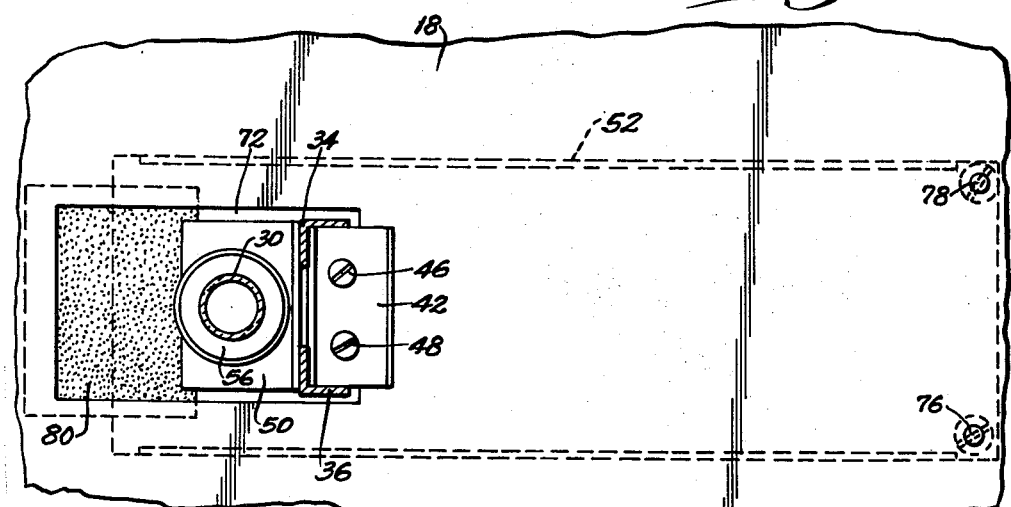
Figure 5 is a view of the housing taken substantially as shown on line 5—5 of Figure 2.

Referring now to the drawing, and more particularly to Figure 1, there is shown a heating furnace of the type utilized in forced air or gravity types of heating systems with which the air purifying unit constituting the invention may advantageously be utilized. It will be understood by those skilled in the art that although the invention is shown with a heating furnace for the purpose of illustrating its principles, various other types of controlled air circulating systems such as air conditioning systems, may equally advantageously be used with the invention.

The heating furnace generally designated as 10 in Figure 1 is of conventional construction and comprises an enclosure 12 defining a heating chamber therein. A heated air duct 16 is provided at one side of the upper portion of enclosure 12 and a cold air return duct 18 is provided at the other side of the upper portion of enclosure 12 such that the air circulating through the system is returned to the furnace 10 for further heating therein. A filter 20 of conventional construction is placed across the cold air return duct 18 within enclosure 12 for providing a mechanical filtering action undesirable airborne matter such as dust, microorganisms and the like. Advantageously filter 20 is mounted within enclosure 12 in a manner which facilitates removal of the filter for cleaning or replacement of the latter.

In accordance with an aspect of this invention an electronic air purifying unit is operatively associated with air return duct 18 to aid filter 20 in the removal of dust particles from the return air, to freshen the return air by effectively destroying odors therein and to effectively destroy bacteria, viruses and other undesirable airborne microorganisms in the return air. The air purifying unit basically comprises a source of ultraviolet radiations in the form of an elongated lamp 26 which is positioned to extend substantially across duct 18 in the path of the return air forward of filter 20. Ultraviolet lamp 26 is supported by a housing (not shown) attached at right angles to lamp 26 and adapted to be mounted in supporting relation on the outside wall of enclosure 12 in a manner described in greater detail below.

The construction of air purifying unit 24 is shown in Figures 2 through 5 of the drawing. The unit comprises an ultraviolet lamp 26 which advantageously is in the form of an elongated cylindrical glass envelope or bulb 30 having an electrode 32 defined by a strong steel shell at each end thereof. In accordance with the invention, ultraviolet lamp 26 is of the two wave band cold cathode type such as are manufactured with 96% fused silica glass tubing and which operate at current ratings of 130 ma. and up. Cold cathode ultraviolet germicidal and ozone lamp suitable for this purpose advantageously may be of the type sold under the names "Sampson" and "Sterilamp."

The ultraviolet radiation generated in lamp 26 includes energy at 2537 Angstrom units and at 1850 Angstrom units. The ultraviolet radiations in the 2537 A. range are germicidal rays which effectively destroy airborne germs, viruses, bacteria, mold spores and other undesirable microorganisms upon which the rays are irradiated. The ultraviolet radiations in the 1850 A. range have the power of generating ozone which is a form of oxygen and is in and of itself a bactericidal and fungicidal agent.

The ultraviolet lamp 26 is supported by a pair of parallel spaced elongated rails 34 and 36 having a right angle bracket 38 attached to one end thereof and a right angle bracket 40 having an angled flange 42 attached at the other end thereof.

Bracket 38 has a socket 44 secured thereto into which one end of ultraviolet lamp 26 is inserted. Bracket 40 is attached by means of threaded screws 46 and 48 to the front wall 50 of housing 52. Rails 34 and 36 are spaced from each other to define a channel 54 therebetween to enable substantially 360° radiation from ultraviolet lamp 26. Thus, it will be appreciated that the construction of tube supporting rails 34 and 36 is such as to maximize ultraviolet radiations from the lamp to enhance the efficiency of the purifying unit in duct 18.

Ultraviolet lamp 26 extends through an opening 56 in front wall 50 of housing 52 and is inserted in a socket 58 mounted on the rear wall 60 of housing 52. This construction enables the elongated ultraviolet lamp 26 to be mounted without difficulty even in ducts of relatively small widths. Also, it will be appreciated that mounting the ultraviolet lamp 26 in socket 58 located in housing 52 attached to the outside wall of the duct enables maximum radiation from the ultraviolet lamp within the duct itself. Thus by locating the lamp socket and its associated transformer completely outside of the duct, a greater amount of radiation area from the ultraviolet lamp is provided in the path of the return air. This, of course, serves to greatly increase the efficiency of the purifying unit in duct 18.

It will be appreciated further that for maximum efficiency, the lamp should protrude as far as possible into the return air duct.

The walls of housing 52 define a substantially hollow rectangular enclosure within which is placed a high voltage transformer adapted for supplying operating potentials to ultraviolet lamp 26 in any suitable manner known in the art. One high voltage output lead 62 from the power transformer is connected to socket 58 in conductive relation with one electrode 32 of lamp 26 and the other high voltage output lead 34 is extended beneath rail 36 and connected to socket 44 in conductive relation with the other electrode 32 of lamp 26. Operating potential such as 110–120 volt, 60 cycle A.C., is provided from any suitable source through power conductors 70 inserted through the bottom wall of housing 52 connected to the power transformer therein.

In accordance with an aspect of this invention the air purifying unit 24 is quickly and easily installed with the return air duct 18 of an existing controlled air circulating system by cutting a relatively small hole 72 in one wall of duct 18. The ultraviolet lamp 26 and supporting rails 34 and 36 are inserted through hole 72 into duct 18 such that ultraviolet lamp 26 is positioned substantially across the duct in the path of the return air forward of the filter 20.

A modification of this device would entail the use of a multiplicity grouping of the ultraviolet lamps 26 extending substantially across the duct 18. This modification is desirous in order to enhance the radiation effect in proportion to an increase of volume of air to be transported through the aforementioned duct.

In addition, it is desirous to increase the radiation effect by extending the length of the entire air purifying unit 24 beyond the outer side wall of a duct system so that the bracket 38 and socket 44 which secures one end of the ultraviolet lamp 26, is positioned externally to said duct 18. A protection cap unit may be inserted over said socket 24 in order to protect the device. This construction allows the ultraviolet lamp 26 to have its entire effective area positioned internally within the duct system in order to provide maximum radiation thereby maximizing the efficiency of such a unit.

The air purifying unit 24 is locked into place by slipping angled flange 42 of bracket 40 over the bottom edge 74 of hole 72 such that housing 52 rests against the wall by duct 18. Air purifying unit 24 can be further secured by means of a pair of sheet metal screws 76 and 78 inserted through holes on the front face 50 of housing 52 and threaded into the wall of duct 18.

In the operation of air purifying unit 24 the energization of ultraviolet lamp 26 by the transformer of housing 52 causes ultraviolet radiations in two bands to be generated within the ultraviolet lamp. The ultraviolet radiations in the first band contain energy at 2537 Angstrom units which are germicidal in nature and therefore are effective to destroy airborne germs, viruses, bacteria, mold spores, and other undesirable airborne organisms in the return air. Additionally, the radiation at 2537 Angstrom units destroys the undesirable organisms which are not destroyed in the air stream and which are caught on the face of filter 20, as the filter is constantly being irradiated by the lamp.

The radiation energy at 1850 Angstrom units generates ozone in the vicinity of ultraviolet lamp 30 and filter 20. The ozone is an active form of oxygen and thus serves as a strong oxidizing agent for effectively destroying odors such as those created by tobacco, cooking, staleness and the like, which are in the return air to provide the air with an outdoor air freshness as it is recirculated through the system.

The ozone additionally serves to enhance the efficiency of filter 20 in collecting dust from the return air by causing the dust particles to be electronically precipitated upon the filter 20. This action results from a negative charge which is given the surface of ultraviolet lamp 30 due to the ozone formed thereby. The ozone is almost completely decomposed at the face of filter 20 with the attending result that the filter acquires a positive charge at its face. Thus when the dust particles in the return air pass ultraviolet lamp 30 they acquire negative charge and are repelled by the lamp towards the filter 20. The dust particles are further attracted to the filter by reason of its positive charge and are removed from the return air and collected by the filter.

It will be appreciated that two advantageous results are achieved by the above described action. The first advantage is that the repulsion of the charged particles by the ultraviolet lamp keeps the lamp clean for a long period of time and thereby increases the effectiveness of the lamp in irradiating ultraviolet energy in the 1870 A band and 2537 A band. The second advantage is that the attraction of the dust particles to the filter 20 enables the filter to remove much greater quantities of dust from the return air and thereby substantially increases the efficiency of the filter.

Figure 6:
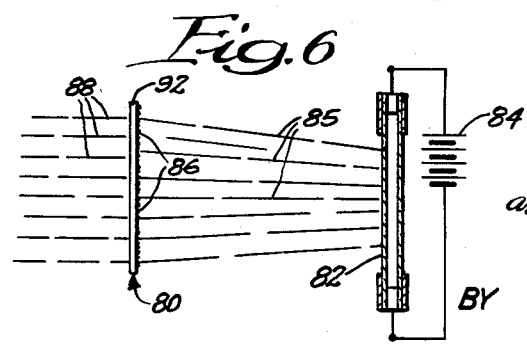
Figures 6 and 7 are views illustrating the operation and construction of the luminous indicator marker which may be embodied in the present invention.
Figure 7:
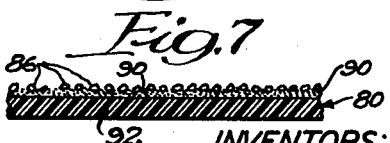

It is contemplated that the operation of ultraviolet lamp 30 may be checked by means of a luminous indicator marker 80 responsive to ultraviolet radiations in the 2537 A range provided above housing 52 and in communication with the interior of duct 18. Advantageously marker 80 may be of the type described briefly below in conjunction with Figures 6 and 7 of the drawing. In Figure 6 numeral 82 designates a conventional source of ultraviolet radiation, such as ultraviolet lamp 30 described above, which is energized by a source of power 84 connected to the electrodes at opposite ends of tube 82. Radiation from tube 82 impinges upon a luminescent barrier material 86 which is responsive to the ultraviolet radiation 85 from source 82 and capable of converting the ultraviolet radiation 85 into visible light 88. The luminescent barrier material 86 is preferably embedded in a binder 90 which is capable of allowing the transmission of ultraviolet radiation therethrough with a relatively small amount of absorption and also will allow the transmission of the converted visible light 88 to pass through the visible light supporting structure 92.

Advantageously the luminescent barrier material may be thus generally classified as O-dominated phosphorous which fluoresces in the 1850 A—2537 A—3650 A range. The visible light transmitting structure 92 may be of various chemical compositions such as glass, ceramic, fiber glass, plastic, fiber, mica or any other transparent or translucent material.

Indicator marker 80 advantageously is positioned adjacent opening 72 in the wall of duct 18 with its luminescent barrier material 86 facing inwardly of the duct in communication with the rays irradiating from ultraviolet lamp 30 therewithin. In this manner indicator marker 80 will luminesce only when ultraviolet lamp 30 is on and working properly. This luminescence may be seen as a visible glow through the light transmitting structure 92 on the outside of duct 18.

It will be appreciated that the above described construction of the air purifying unit 24 is highly advantageous in that it provides a quick and easy means of installing the purifying unit in an existing air circulating system duct and in that the power transformer for the unit is positioned outside the duct such that there is no contribution of heat from the transformer to the air circulated within the duct. It further will be appreciated that the construction of the spaced rails 34 and 36 of the ultraviolet lamp support structure adds to the efficiency of the unit by providing turbulence of the air circulated within the duct.

It will be understood by those skilled in the art that modifications may be made in the construction and arrangement of the parts of the above described air purifying unit without departing from the real purpose and spirit of the invention and that it is intended to cover by the appended claims any modified forms of structures, circuits or use of equivalents which reasonably may be included within their scope.

We claim as our invention:

1. In a purifier for a controlled air circulating system of the type having a duct through which the air is circulated, the improvement of an elongated, germicidal ultraviolet radiating unit extending across the duct and directly in the path of air flow within the duct; support means for said ultraviolet radiating unit for supporting the latter within the duct to permit substantially 360° radiation of the ultraviolet radiations from said unit; a filter unit positioned in the duct rearwardly of the said ultraviolet radiating unit in the path of air flow; said filter unit having a surface extending across substantially the entire configuration of the duct and substantially perpendicular to the radiations from said ultraviolet radiating unit to maximize the radiation area affected by said radiations, so that substantially the entire surface of the filter is subjected to ultraviolet radiations; and power supply means for energizing the ultraviolet radiating unit to produce ultraviolet radiations in a first band capable of effectively destroying undesirable organisms in the air and on the surface of the filter and ultraviolet ionizing radiations in a second band capable of forming ozone in the duct to produce a charge of one potential on the unit and a charge of opposite potential on a surface of the filter whereby particles of dust are charged to said one potential when passing the unit and are attracted to and collected by the oppositely-charged filter.

2. In a purifier in accordance with claim 1 wherein said ultraviolet radiating unit is positioned substantially perpendicular to the air flow within said duct and said support means comprises a plurality of parallel spaced members defining a channel therebetween for enabling substantially 360° radiation from said ultraviolet radiating unit.

3. In a purifier in accordance with claim 1 wherein ultraviolet radiations of said first band are in the 2537 Angstrom radiation band and the ultraviolet radiations of said second band are in the 1870 Angstrom radiation band.

References Cited in the file of this patent

UNITED STATES PATENTS

| | | |
|---|---|---|
| 1,054,589 | Mestern | Feb. 25, 1913 |
| 2,183,387 | Anderson | Dec. 12, 1939 |
| 2,203,188 | Beer | June 4, 1940 |
| 2,549,087 | Harshbarger | Apr. 17, 1951 |
| 2,638,644 | Rauhut | May 19, 1953 |